Sept. 3, 1968 R. L. BRUCKNER 3,400,277

VOLTAGE LEVEL CONVERTER CIRCUIT

Filed May 26, 1965

INVENTOR
RONALD L. BRUCKNER

BY Louis A. Kline

Albert L. Sessler, Jr.

HIS ATTORNEYS

United States Patent Office 3,400,277

Patented Sept. 3, 1968

3,400,277

VOLTAGE LEVEL CONVERTER CIRCUIT

Ronald L. Bruckner, Dayton, Ohio, assignor to The National Cash Register Company, Dayton, Ohio, a corporation of Ohio Filed May 26, 1965, Ser. No. 458,929
1 Claim. (Cl. 307—264)

ABSTRACT OF THE DISCLOSURE

A voltage level converter circuit in which a clock signal, and a line input signal which varies between specified voltage levels, are employed to produce an output signal which varies between different specified voltage levels. To improve noise rejection, a resistive-capacitive delay is introduced between the circuit input and the output, which requires that the clock input and the line input remain at a given logical signal level simultaneously for a certain predetermined minimum period of time before the output signal is switched to a logic level which corresponds to the input logic level.

This invention relates to level converter means, and more specifically relates to level converter means in which a clock signal, and a line input signal which varies between specified voltage levels, are both employed to produce an output signal which varies between different specified voltage levels, depending upon the source voltage and load impedance of the circuit to which the output is connected.

Level converting devices find wide use in many types of electronic systems, including data processing systems, in which it is often necessary to communicate between two or more different devices which operate on different ranges of voltage levels. The output signal may be used, for example, to trigger a flip-flop to a given state, with the flip-flop remaining in that state until reset to its other state by a signal from some other source.

In the present invention, a clock input as well as a line input is employed, in order to improve noise rejection by sampling the input signal only for specified periods of time, since there may be a considerable amount of noise in the line input. This is due to the fact that long conducting cables may be used between pieces of equipment in certain systems in which the level converter of the present invention may be employed. As a result, noise may arise from a number of causes, such as cross-talk between adjacent conductors, and the antenna effect of a conductor of extended length. To further improve the noise rejection, a delay is introduced between the circuit input and the output, which requires that the clock input and the line input remain at a given logical signal level simultantaneously for a certain predetermined minimum period of time before the output signal is switched to a logic level which corresponds to the input logic level. This prevents most noise pulses, which are of less than the specified minimum duration, from having any effect upon operation of the system.

It is accordingly an object of the present invention to provide simple, effective level converter means.

Another object is to provide level converter means which utilizes a clock input signal in addition to the line input signal.

A further object is to provide level converter means having improved noise rejection ability.

With these and other objects, which will become apparent from the following description, in view, the invention includes certain novel features of construction and combinations of parts, a preferred form or embodiment of which is hereinafter described with reference to the drawing which accompanies and forms a part of this specification.

Figure 1:
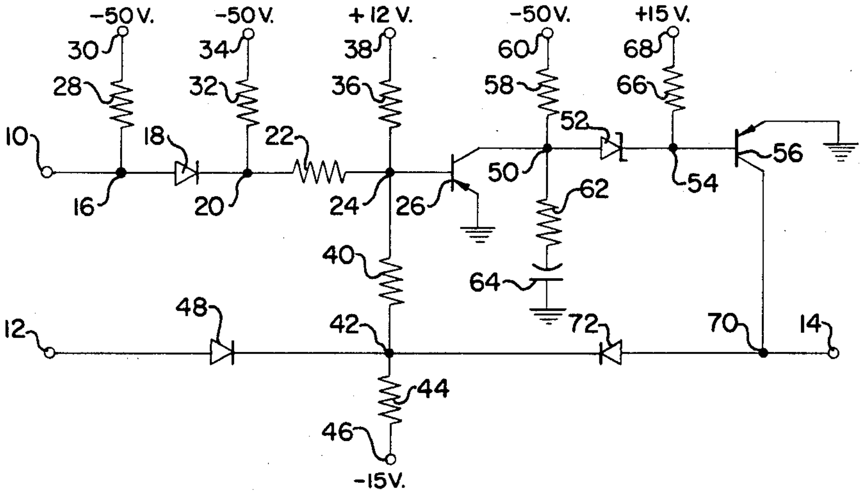
FIG. 1 is a schematic diagram of a preferred embodiment of the level converter means of the present invention.

Referring now to FIG. 1 of the drawing, there is shown a level converter circuit which includes a line input terminal 10, a clock input terminal 12, and a line output terminal 14. The high and low levels of the input signal may be varied in accordance with the device from which they are taken, and the values of the various components utilized in the level converter circuit. For purposes of illustration, it will be assumed that the input signal applied at the terminal 10 has a high or true logic level which may vary between zero and minus 8 volts, and a low or false logic level which may vary between minus 45.5 volts and minus 56.6 volts. The reason for the large tolerance in voltage levels at the input terminal is that the level converter device may be connected to the device which furnishes input signals to it over a cable which may vary in length greatly according to the particular installation with which the level converter is used. This possible variation of cable length makes necessary a large tolerance in input voltage levels.

Also it will be assumed that the clock signal applied to the terminal 12 has a high logic level of approximately zero volts and a low logic level of approximately minus 7 volts. It will also be assumed that the clock signal has a minimum pulse width of 60 microseconds at the high logic level. The parameters and tolerances of the illustrated embodiment of the circuit are such that a clock pulse width of under 25 microseconds is not sufficient to produce an output signal, while a clock pulse width of from 25 to 60 microseconds may or may not be sufficient to produce an output pulse, depending upon the specific values of the various components employed. The clock pulse repetition rate may vary according to the particular requirements of the system with which the level converter device of the present invention is used. It will further be assumed that the output signal which is taken from the terminal 14 of the level converter device has a high logic level of approximately zero volts and a low logic level of approximately minus 7 volts. It will be understood that the output logic levels are dependent upon the source voltage and load impedance of the particular circuit to which the output terminal 14 is connected.

The line input terminal 10 is connected over a point 16, an isolating diode 18, a point 20, a resistor 22, and a point 24 to the base electrode of a PNP-type resistor 26. The point 16 is connected over a resistor 28 to a terminal 30, to which is applied a source of minus 50-volt potential. This potential may be used to provide a "cleaning" effect upon relay contacts employed in the device which is connected to the input terminal 10 in the event that said device employs such contacts. The use of this potential across the contacts burns off oxide which might otherwise form, and thus lengthens the effective life of the contacts. In the event that relay contacts are not employed in the device which is connected to the terminal 10, the resistor 28, connected to the terminal 30, may still aid in improving the noise rejection at the lower logical level, in that the diode 18 is reverse-biased so that noise signals of larger amplitude can appear at the input terminal 10 without disturbing the circuit.

The point 20 is connected over a resistor 32 to a terminal 34, to which is applied a source of minus 50-volt potential. From the point 24, a first path extends over a resistor 36 to a terminal 38, to which is applied a source of plus 12-volt potential. A second path extends from the point 24 over a resistor 40, a point 42, and a resistor 44 to a terminal 46, to which is applied a source of minus 15-volt potential. An isolating diode 48 connects the point 42 to the clock input terminal 12.

The emitter electrode of the transistor 26 is connected to a base reference potential, shown in the drawing as ground, and the collector electrode of said transistor is connected over a point 50, a Zener diode 52, and a point 54 to the base electrode of a second PNP-type transistor 56. Some other suitable means, such as a resistor, could be employed, if desired, for establishing a potential difference between the point 50 and the base electrode of the transistor 56. However, the Zener diode has been found to give more precise tolerances than any other means considered.

From the point 50, a first path extends over a resistor 58 to a terminal 60, to which is applied a source of minus 50-volt potential, and a second path extends over a resistor 62 and a capacitor 64 to a base reference potential, shown in the drawing as ground. From the point 54, a path extends over a resistor 66 to a terminal 68, to which is applied a source of plus 15-volt potential.

The emitter electrode of the transistor 56 is connected to a base reference potential, shown in the drawing as ground, while the collector electrode of said transistor is connected over a point 70 and an isolating diode 72 to the point 42. Also connected to the point 70 is the output terminal 14.

In the illustrated embodiment of the level converter of the present invention, circuit components of the following type or value may be employed:

| Components: | Values |
|---|---|
| Resistor **22** | 15,000 ohms. |
| Resistor **28** | 27,000 ohms. |
| Resistor **32** | 13,000 ohms. |
| Resistor **36** | 13,000 ohms. |
| Resistor **40** | 3,900 ohms. |
| Resistor **44** | 4,700 ohms. |
| Resistor **58** | 20,000 ohms. |
| Resistor **62** | 430 ohms. |
| Resistor **66** | 33,000 ohms. |
| Capacitor **64** | 0.01 microfarad. |
| Diode **18** | D949. |
| Diode **48** | D949. |
| Diode **72** | D949. |
| Zener diode **52** | SV128. |
| Transistors **26** and **56** | NCR404B, which is a 2N404 transistor specially selected for high minimum beta characteristic. |

Of course it will be realized that the above component types and values, as well as the voltage levels given in the specification, are merely illustrative, and could be altered to meet specific circuit requirements, such as different input and output voltage levels.

The mode of operation of the level converter of the present invention will now be described. Let it be assumed that the signals at the line and clock input terminals 10 and 12 respectively are both at the lower logic level, in which case the output signal at the output terminal 14 is also at the lower logic level, as shown at the left side of the various wave forms of FIG. 2, which are designated respectively, from top to bottom, as "LINE INPUT," "CLOCK INPUT," and "OUTPUT." Under these conditions, the transistor 26 is conducting, and the transistor 56 is cut off.

The output signal at the terminal 14 remains at the lower level or false logic level until a predetermined time delay period has elapsed after both the line and clock input signals at the terminals 10 and 12 go true and remain true at least for this given minimum period. A positive-going signal from the false level to the true level on one of the two terminals 10 or 12, without a corresponding true signal on the other, is not effective to produce a true output signal at the terminal 14.

When both the line and clock input signals go true, the voltage level at the point 24, and therefore the potential on the base electrode of the transistor 26, increases in a positive direction sufficiently to cause said transistor to be cut off. This causes the capacitor 64 to commence charging toward the minus 50-volt potential at the terminal 60. The charging action produces a negative-going potential on the base electrode of the transistor 56, and after a given period of time, determined by the capacitance of the capacitor 64, the resistance of the resistors 58 an 62, and the voltage drop across the Zener diode 52, the potential at the base electrode of the transistor 56 is sufficiently negative to cause said transistor to commence conducting.

Conduction of the transistor 56 causes the potential on its collector electrode to rise to a level of approximately ground or zero volts from its previous minus 7-volt potential level. Since the output terminal 14 is connected to the collector electrode of the transistor 56 at the point 70, this change in potential is reflected on the output terminal 14, so that the output signal changes from a minus 7-volt potential level to a zero-volt potential level, as may be seen in FIG. 2. In addition, since the point 42 is connected to the collector electrode of the transistor 56 over the diode 72 and the point 70, the change in potential level to zero volts also appears at the point 42, which effectively inhibits the clock input signal at the terminal 12.

It may be noted that it is necessary for both the clock input signal and the line input signal to remain at a true logic level until this inhibiting action takes place, in order for a true output signal to be produced by the circuit at the output terminal 14. The time required for this output signal to be produced after the true level signals have been received at the line input terminal 10 and the clock input terminal 12 is the defined delay of the circuit, and is dependent upon the RC time of the capacitor 64 and its associated resistors.

Figure 2:
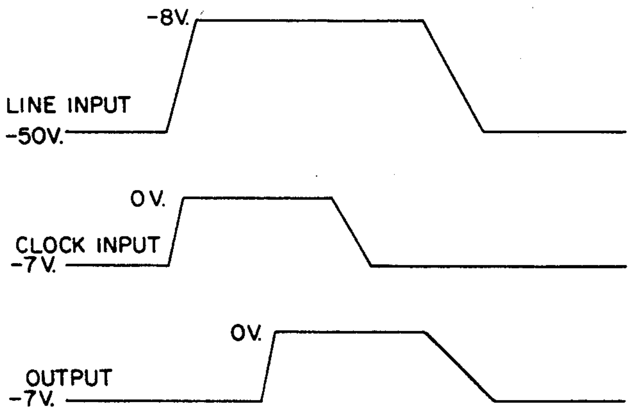
FIG. 2 shows input, clock, and output signal wave forms for the circuit of FIG. 1.

So long as the clock signal at the input terminal 12 is inhibited, only the line input signal has control over the circuit, and so long as that signal remains true, the output signal at the terminal 14 will remain true, as may be noted from the wave forms of FIG. 2. When the line input signal is shifted to a false logic level, the negative-going signal is applied to the base electrode of the transistor 26, and causes that transistor to commence conducting. This provides a discharge path for the capacitor 64 and causes the potential on the base electrode of the transistor 56 to rise, cutting off said transistor and causing the potential on the collector electrode of said transistor to fall to a false logic level of approximately minus 7 volts. Since the output terminal 14 is connected to the collector electrode of the transistor 56, as has been previously described, the output signal shifts from a true logic level of zero volts to a false logic level of minus 7 volts, as may be seen from the wave form of FIG. 2.

At the same time, the dropping of potential level to minus 7 volts on the collector electrode of the transistor 56 terminates the inhibiting of the clock input at the terminal 12. In order to produce another true input signal, it is necessary that both the line input signal and the clock input signal shift once more to a true logic level. A true output signal is then generated in the manner described above.

While the form of the invention illustrated and described herein is particularly adapted to fulfill the objects aforesaid, it is to be understood that other and further modifications within the scope of the following claim may be made without departing from the spirit of the invention.

What is claimed is:

1. A level converting circuit for converting an input signal varying between specified logic levels to a corresponding output signal varying between different specified logic levels, comprising, in combination, line input means to which the signal to be converted is applied;

clock input means to which a clock signal is applied;

first signal translating means having an emitter electrode coupled to a reference potential, a collector electrode, and a control electrode to which the line input means and the clock input means are coupled so that the signals thereon may control the state of conduction of said first signal translating means;

means for applying operating potential to said first signal translating means;

second signal translating means having an emitter electrode coupled to said reference potential, a collector electrode and a control electrode;

means for applying operating potential to said second signal translating means;

means for developing a potential difference, being DC-coupled to the collector electrode of said first signal translating means and to the control electrode of the second signal translating means;

charging means coupled to the collector electrode of said first signal translating means, and capable of accepting a predetermined charge, and of discharging through said first signal translating means when it is conducting, the charging means controlling the state of conduction of the second signal translating means in accordance with the charge on said charging means;

means coupling the collector electrode of the second signal translating means to the clock input means to inhibit the clock input signal when the second signal translating means is conducting; and line output means coupled to the collector electrode of said second signal translating means, on which an output signal, corresponding to the input signal, but varying between different logic levels, appears.

References Cited

UNITED STATES PATENTS

| | | | |
|---|---|---|---|
| 3,040,185 | 6/1962 | Horton | 307—88.5 |
| 3,188,484 | 6/1965 | Jorgensen | 307—88.5 |
| 3,171,978 | 3/1965 | Weber | 307—88.5 |
| 3,243,652 | 3/1966 | Meyer et al. | 307—88.5 XR |

ARTHUR GAUSS, *Primary Examiner.*

J. ZAZWORSKY, *Assistant Examiner.*